US012578578B2

(12) United States Patent
Kim et al.

(10) Patent No.: US 12,578,578 B2
(45) Date of Patent: Mar. 17, 2026

(54) DISPLAY DEVICE AND METHOD FOR DRIVING THE SAME

(71) Applicant: SAMSUNG DISPLAY CO., LTD., Yongin-si (KR)

(72) Inventors: Dong Woo Kim, Yongin-si (KR); Kwi Hyun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 310 days.

(21) Appl. No.: 18/509,503

(22) Filed: Nov. 15, 2023

(65) Prior Publication Data

US 2024/0288693 A1 Aug. 29, 2024

(30) Foreign Application Priority Data

Feb. 23, 2023 (KR) ......................... 10-2023-0024388

(51) Int. Cl.
*G02B 27/01* (2006.01)
(52) U.S. Cl.
CPC ..... *G02B 27/0172* (2013.01); *G02B 27/0179* (2013.01); *G02B 2027/014* (2013.01); *G02B 2027/0178* (2013.01); *G02B 2027/0187* (2013.01)
(58) Field of Classification Search
CPC ............ G02B 27/0172; G02B 27/0179; G02B 2027/014; G02B 2027/0178; G02B 2027/0187

USPC .......................................... 359/630; 345/7–9
See application file for complete search history.

(56) References Cited

U.S. PATENT DOCUMENTS

2022/0365741 A1 * 11/2022 Yuki ....................... G06F 3/011

FOREIGN PATENT DOCUMENTS

| | | |
|---|---|---|
| CN | 110426845 | 11/2019 |
| KR | 10-2002-0059257 | 7/2002 |
| KR | 10-2019-0069758 | 6/2019 |
| KR | 10-2022-0063467 | 5/2022 |

* cited by examiner

*Primary Examiner* — William Choi
(74) *Attorney, Agent, or Firm* — F. CHAU & ASSOCIATES, LLC

(57) ABSTRACT

A display device includes glasses disposed to correspond to a display area of a lens. A display panel emits display light. A reflective member reflects the display light emitted from the display panel in a direction towards the glasses. A light source unit emits near-infrared light towards a user's eyes for tracking a user's eyes. A protective filter includes a liquid crystal layer. The protective filter blocks a portion of a light path of the near-infrared light emitted towards the user's eyes from the light source unit. A processor controls the liquid crystal layer. The liquid crystal layer forms a blocking area blocking the portion of the light path of the near-infrared light emitted towards the user's eyes and a transmission area that does not block the light path of the near-infrared light emitted towards the user's eyes.

20 Claims, 14 Drawing Sheets

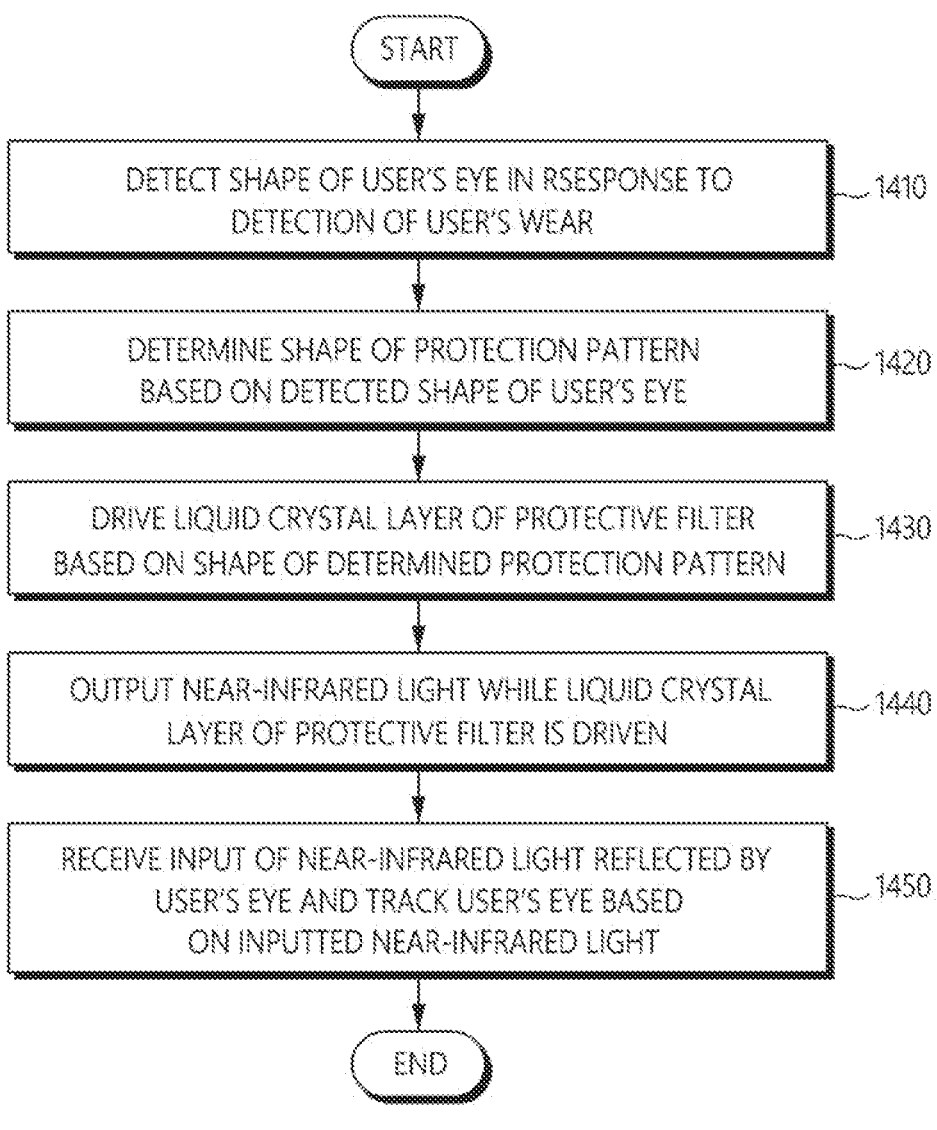

START

DETECT SHAPE OF USER'S EYE IN RSESPONSE TO
DETECTION OF USER'S WEAR                                 ~1410

DETERMINE SHAPE OF PROTECTION PATTERN
BASED ON DETECTED SHAPE OF USER'S EYE                    ~1420

DRIVE LIQUID CRYSTAL LAYER OF PROTECTIVE FILTER
BASED ON SHAPE OF DETERMINED PROTECTION PATTERN          ~1430

OUTPUT NEAR-INFRARED LIGHT WHILE LIQUID CRYSTAL
LAYER OF PROTECTIVE FILTER IS DRIVEN                     ~1440

RECEIVE INPUT OF NEAR-INFRARED LIGHT REFLECTED BY
USER'S EYE AND TRACK USER'S EYE BASED
ON INPUTTED NEAR-INFRARED LIGHT                          ~1450

END

DISPLAY DEVICE AND METHOD FOR DRIVING THE SAME

CROSS-REFERENCE TO RELATED APPLICATION

This application claims priority under 35 U.S.C. § 119 to Korean Patent Application No. 10-2023-0024388, filed on Feb. 23, 2023 in the Korean Intellectual Property Office, the disclosure of which is incorporated by reference in its entirety herein.

1. TECHNICAL FIELD

The present disclosure relates to a display device and method for driving the same.

2. DISCUSSION OF RELATED ART

A wearable device has been developed in the form of glasses or a helmet so that a focus is formed at a distance close to a user's eyes. For example, the wearable device may be a head mounted display (HMD) device or augmented reality (AR) glasses. The wearable device provides a user with an augmented reality (AR) screen or a virtual reality (VR) screen.

The wearable device such as the HMD device or the AR glasses requires a minimum display specification of 2000 PPI (pixels per inch) to allow a user to use it for a relatively long period of time without experiencing dizziness. To this end, an organic light emitting diode on silicon (OLEDoS) technology, which is related to a high-resolution compact organic light emitting display device, has emerged. The OLEDoS technology involves the arranging of an organic light emitting diode (OLED) on a semiconductor wafer substrate on which a complementary metal oxide semiconductor (CMOS) is disposed.

The wearable device tracks movement of a user's eyes and varies resolution of a screen based on the tracked movement of the user's eyes when displaying an AR screen or a VR screen. For example, the wearable device may detect a direction of the user's gaze and determine a central vision area corresponding to the gaze and a peripheral vision area outside of the central vision area. A foveated rendering technology for displaying a high-resolution screen on the central vision area and displaying a low-resolution screen on the peripheral vision area may be applied to the wearable device. The wearable device may irradiate near-infrared light having an output wavelength in a range of about 780 nm to about 1400 nm to the user's eyes to track the movement of the user's eyes, and may detect the near-infrared light reflected from the user's eyes.

SUMMARY

Aspects of embodiments of the present disclosure provide a display device protecting the eyes of a user from the near-infrared light outputted from a display device for eye tracking function and a method for driving the same.

According to an embodiment of the present disclosure, a display device includes glasses disposed to correspond to a display area of a lens. A display panel emits display light. A reflective member reflects the display light emitted from the display panel in a direction towards the glasses. A light source unit emits near-infrared light towards a user's eyes for tracking a user's eyes. A protective filter includes a liquid crystal layer. The protective filter blocks a portion of a light path of the near-infrared light emitted towards the user's eyes from the light source unit. A processor controls the liquid crystal layer. The liquid crystal layer forms a blocking area blocking the portion of the light path of the near-infrared light emitted towards the user's eyes and a transmission area that does not block the light path of the near-infrared light emitted towards the user's eyes.

In an embodiment, the display panel may include a semiconductor wafer substrate and an OLED disposed on the semiconductor wafer substrate.

In an embodiment, the display panel may include a red pixel emitting red light, a green pixel emitting green light, a blue pixel emitting blue light, and a sensor pixel including a photodiode sensing the near-infrared light from the light source unit that is reflected by the user's eyes.

In an embodiment, the transmission area may include a plurality of transmission areas. The plurality of transmission areas may be disposed to surround an outside of the blocking area.

In an embodiment, the plurality of transmission areas may be arranged to be symmetrical with respect to a center of the protective filter.

In an embodiment, the processor adjusts a length and a width of each of the plurality of transmission areas according to a shape of an eye of the user.

In an embodiment, the processor senses the shape of an eye of the user in response to a trigger event that detects that the user is wearing the display device, determines a shape of a protection pattern including the plurality of transmission areas and the blocking area based on the sensed shape of the user's eye, and drives the liquid crystal layer to form the protection pattern having the determined shape of the protection pattern.

In an embodiment, the shape of the user's eye may include a size of a pupil of the user and a size of an iris of the user.

In an embodiment, the processor controls the light source unit to emit the near-infrared light while a liquid crystal layer of the protective filter is driven, tracks the user's eye by detecting near-infrared light from the light source unit that is reflected by the user's eye using sensor pixels of the display panel, determines a central vision area corresponding to a sight of the user and a peripheral vision area excluding the central vision area based on the tracked user's eye, and controls the display panel to display a screen with a higher resolution in the central vision area than in the peripheral vision area.

According to an embodiment of the present disclosure, a display device includes glasses disposed to correspond to a display area of a lens. A display panel emitting display light. A reflective member reflecting the display light emitted from the display panel in a direction towards the glasses. A light source unit emitting near-infrared light towards a user's eyes for tracking a user's eyes. A smart contact lens attached directly to an eye of the user. The smart contact lens includes a liquid crystal panel blocking a portion of a light path of the near-infrared light emitted towards the user's eye from the light source unit. A processor controlling the liquid crystal panel through wireless communication. The liquid crystal panel forming a blocking area blocking the portion of the light path of the near-infrared light emitted towards the user's eye and a transmission area that does not block the light path towards the user's eye.

In an embodiment, the display panel may include a semiconductor wafer substrate and an OLED disposed on the semiconductor wafer substrate.

In an embodiment, the display panel may include a red pixel emitting red light, a green pixel emitting green light and a blue pixel emitting blue light, and a sensor pixel including a photodiode sensing the light path reflected by the user's eyes.

In an embodiment, the transmission area may include a plurality of transmission areas. The plurality of transmission areas may be disposed to surround an outside of the blocking area.

In an embodiment, the plurality of transmission areas may be arranged to be symmetrical with respect to a center of the smart contact lens.

In an embodiment, the processor adjusts a length and a width of each of the plurality of transmission areas according to a shape of the user's eye.

In an embodiment, the processor senses the shape of the user's eye in response to a trigger event that detects that the user is wearing the display device, determines a shape of a protection pattern including the plurality of transmission areas and the blocking area based on the sensed shape of the user's eye, and drives the liquid crystal panel to form the protection pattern having the determined shape of the protection pattern.

In an embodiment, the shape of the user's eye includes a size of a pupil of the user and a size of an iris of the user.

In an embodiment, the processor controls the light source unit to emit the near-infrared light while a liquid crystal panel of the smart contact lens is driven, tracks the user's eye by detecting the near-infrared light from the light source unit that is reflected by the user's eye using sensor pixels of the display panel, determines a central vision area corresponding to a sight of the user and a peripheral vision area excluding the central vision area based on the tracked user's eye, and controls the display panel to display a screen with a higher resolution in the central vision area than in the peripheral vision area.

According to an embodiment of the present disclosure, a display device may include glasses disposed to correspond to a display area of a lens and a reflective member reflecting display light emitted from a display panel towards the glasses. A method of driving the display device includes detecting a shape of a user's eye in response to a trigger event that determines that the display device is being worn by the user, determining a shape of a protection pattern including a plurality of transmission areas and a blocking area based on the detected shape of the user's eye, and controlling a liquid crystal layer of a protective filter to block a portion of a light path of near-infrared light emitted towards the user's eye from a light source unit based on the determined shape of the protection pattern.

In an embodiment, a method of driving the display device may further include controlling the light source unit to emit near-infrared light while the liquid crystal layer of the protective filter is driven, tracking the user's eye by detecting near-infrared light from the light source unit reflected by the user's eye using sensor pixels of the display panel, determining a central vision area corresponding to a sight of the user and a peripheral vision area excluding the central vision area based on the tracked user's eye, and controlling the display panel to display a screen with a higher resolution in the central vision area than in the peripheral vision area.

The display device and the method for driving the same according to embodiments may protect the eyes of a user from the near-infrared light outputted from a display device for eye tracking function.

However, aspects of embodiments of the present disclosure are not restricted to those set forth herein. The above and other aspects of embodiments of the present disclosure will become more apparent to one of ordinary skill in the art to which the present disclosure pertains by referencing the detailed description of embodiments of the present disclosure given below.

BRIEF DESCRIPTION OF THE DRAWINGS

The above and other aspects and features of the present disclosure will become more apparent by describing in detail non-limiting embodiments thereof with reference to the attached drawings, in which:

FIG. 14 is a flow chart illustrating an operation of a display device according to an embodiment of the present disclosure.

DETAILED DESCRIPTION OF EMBODIMENTS

The present invention will now be described more fully hereinafter with reference to the accompanying drawings, in which non-limiting embodiments of the present disclosure are shown. This present disclosure may, however, be embodied in different forms and should not be construed as limited to the described embodiments set forth herein.

It will also be understood that when a layer is referred to as being "on" another layer or substrate, it can be directly on the other layer or substrate, or intervening layers may also be present. When a layer is referred to as being "directly on" another layer or substrate, no intervening layers may be present. The same reference numbers indicate the same components throughout the specification.

It will be understood that, although the terms "first," "second," etc. may be used herein to describe various elements, these elements should not necessarily be limited by these terms. These terms may only be used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, embodiments of the present disclosure will be described with reference to the accompanying drawings.

Figure 1:
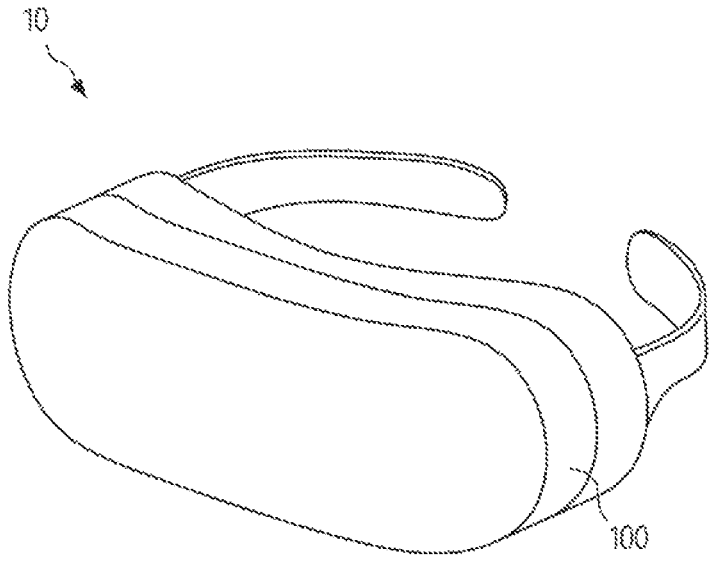
FIG. 1 is a front view illustrating a wearable device including a display device according to an embodiment of the present disclosure.
Figure 2:
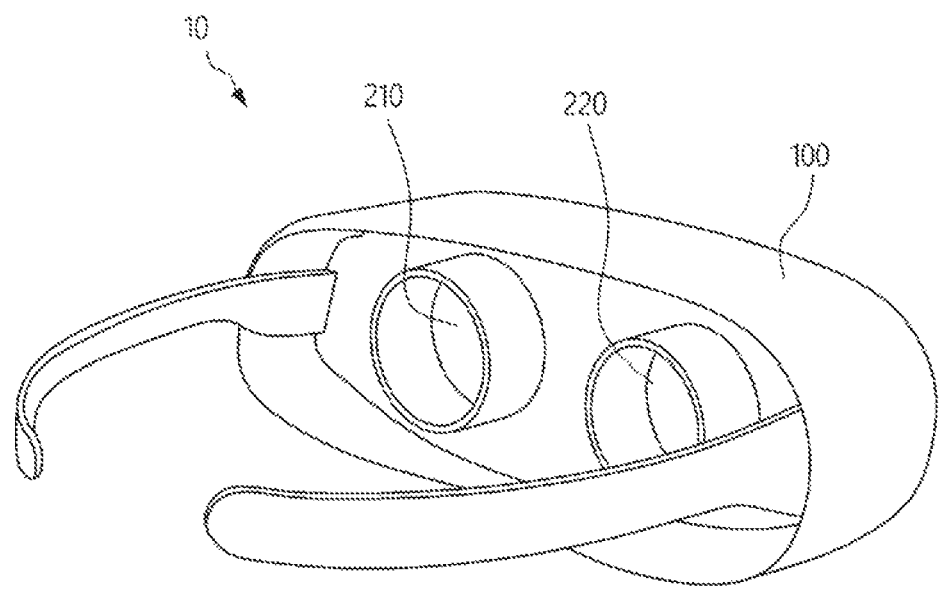
FIG. 2 is a rear view illustrating the wearable device shown in FIG. 1 according to an embodiment of the present disclosure.

FIG. 1 is a front view illustrating a wearable device 100 including a display device 10 according to one embodiment. FIG. 2 is a rear view illustrating the wearable device 100 shown in FIG. 1.

Referring to FIGS. 1 and 2, the display device 10 according to an embodiment may be a display device included in an HMD device. The display device 10 may be disposed inside a main body of the HMD device, and a lens 200 (FIG. 2) for displaying a screen (e.g., images displayed by the display device 10) may be disposed on a rear surface of the main body. In an embodiment, the lens 200 may include a left-eye lens 210 corresponding to a left-eye of a user and a right-eye lens 220 corresponding to a right-eye of the user. Each of the left-eye lens 210 and the right-eye lens 220 may include glasses for displaying a screen output from the display device 10. A method for displaying the screen through the glasses by the display device 10 according to embodiments of the present disclosure will be described later in detail with reference to FIGS. 5 and 9.

Figure 3:
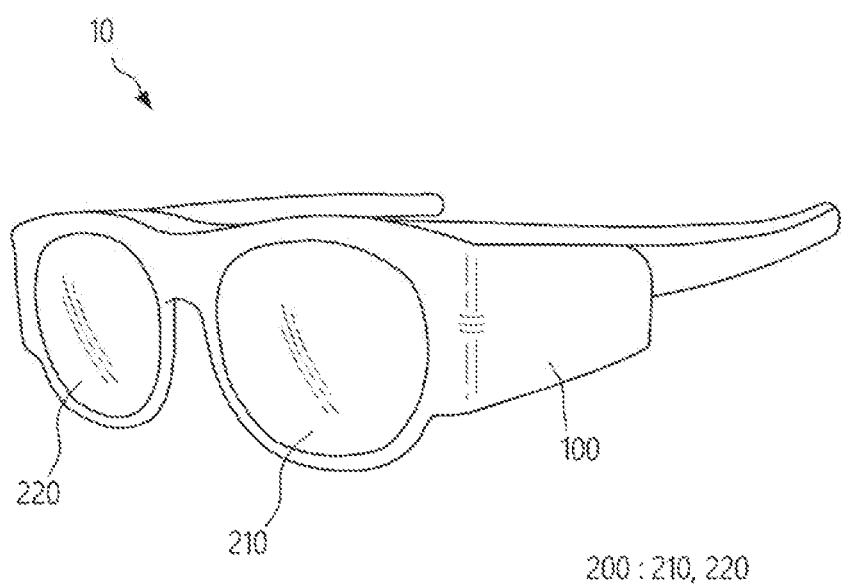
FIG. 3 is a view illustrating a wearable device including a display device according to an embodiment of the present disclosure.

FIG. 3 is a view illustrating the wearable device 100 including the display device 10 according to an embodiment.

Referring to FIG. 3, the display device 10 according to an embodiment may be a display device included in AR glasses. The AR glasses may have an eyeglasses shape, and may include a see-through lens. In an embodiment, the see-through lens may include a left-eye lens 210 corresponding to a left-eye of a user and a right-eye lens 220 corresponding to a right-eye of the user. Each of the left-eye lens 210 and the right-eye lens 220 may include glasses for displaying the screen output from the display device 10. A method for displaying the screen through the glasses by the display device 10 according to embodiments of the present disclosure will be described later in detail with reference to FIGS. 5 and 9.

Figure 4:
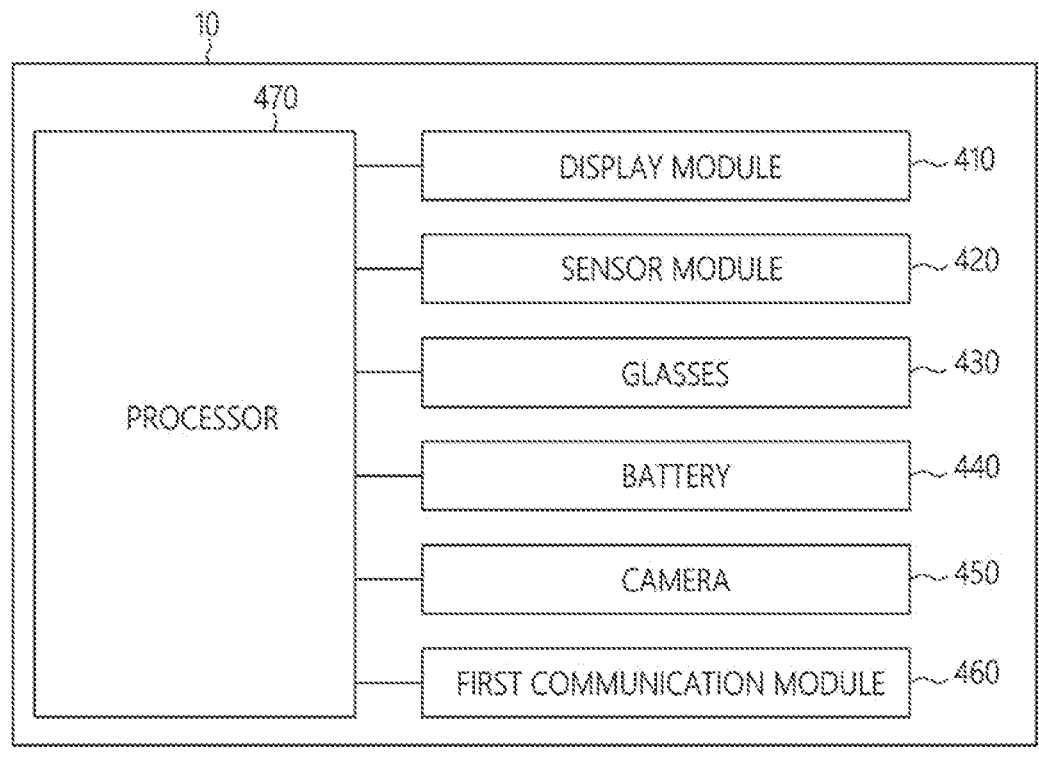
FIG. 4 is a schematic block view illustrating a display device according to an embodiment of the present disclosure.
Figure 5:
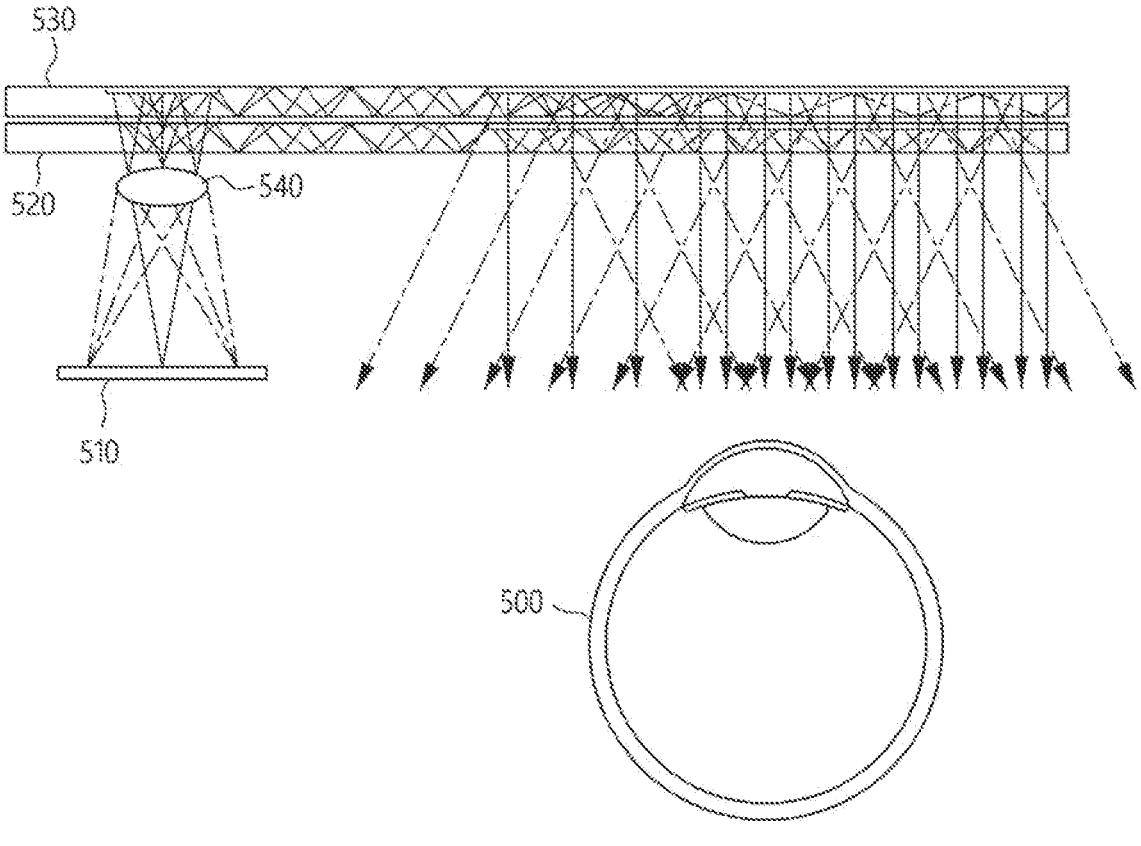
FIG. 5 is a schematic view illustrating a display module according to an embodiment of the present disclosure.

FIG. 4 is a schematic block view illustrating a display device 10 according to an embodiment. FIG. 5 is a schematic view illustrating a display module according to an embodiment. For example, FIG. 5 illustrates an optical path through which display light output from a display panel 510 of the display device 10 moves.

The display device 10 shown in embodiments of FIGS. 4 and 5 may be applied to the HMD device shown in FIGS. 1 and 2 or the AR glasses shown in FIG. 3.

Referring to FIGS. 4 and 5, the display device 10 according to an embodiment may include a processor 470, a display module 410, a sensor module 420, a glasses 430, a battery 440, a camera 450, and a first communication module 460. In an embodiment, the display device 10 may further include other elements described in the present disclosure. Additionally, in some embodiments the display device 10 may omit one or more elements shown in FIG. 4.

In an embodiment, the processor 470 executes command languages stored in a memory to control operations of the elements, such as the display module 410, the sensor module 420, the battery 440, the camera 450, and the first communication module 460 of the display device 10. The processor 470 may be electrically and/or operatively connected to the display module 410, the sensor module 420, the battery 440, the camera 450, and the first communication module 460. The processor 470 may execute software to control at least one other element, such as the display module 410, the sensor module 420, the battery 440, the camera 450 and/or the first communication module 460 connected to the processor 470. The processor 470 may acquire a command from the elements included in the display device 10, interpret the acquired command, and process and/or compute various data in accordance with the interpreted command.

In an embodiment, the display device 10 may receive the data processed through a processor 120 embedded in an external device (e.g., a smartphone or a tablet PC) from the external device. For example, the display device 10 may photograph an object (e.g., a real object or a user's eyes) through the camera 450, and may transmit the photographed image to the external device through the first communication module 460. The display device 10 may receive the data based on the image photographed by the display device 10 from the external device. The external device may generate image data related to augmented reality based on information (e.g., shape, color and/or position) of the photographed object received from the display device 10, and may transmit the image data to the display device 10. The display device 10 may request additional information based on an image obtained by photographing an object (e.g., a real object or user's eyes) through the camera 450 to the external device, and may receive additional information from the external device.

In an embodiment, the display module 410 may include a display panel, such as the display panel 510 of FIG. 5, and a light transfer member, such as waveguides 520 and 530, for transferring light emitted from the display panel 510 to a portion of the glasses 430. In the present disclosure, the display panel 510 may refer to a light source unit for generating display light input to the waveguides, such as waveguides 520 and 530 of FIG. 5. The display panel 510 may be a display panel to which an organic light emitting diode on silicon (OLEDoS) technology is applied. For example, the display panel may include an OLED disposed on a semiconductor wafer substrate on which a complementary metal oxide semiconductor (CMOS) is disposed.

In an embodiment, the display panel 510 of the display module 410 may emit display light for displaying an augmented reality image (or a virtual reality image) based on the control of the processor 470. For example, the display light emitted from the display panel 510 may be transferred a display area of the lens 200 through the waveguides 520 and 530 so that the user may see the display light. The display device 10, such as the processor 470 of the display device 10, may control the display panel 510 in response to the user's input. In some embodiments, types of the user's input may include a button input, a touch input, a voice input, and/or a gesture input, and may include various input methods capable of controlling an operation of the display panel 510. However, embodiments of the present disclosure are not necessarily limited thereto.

Figure 8:
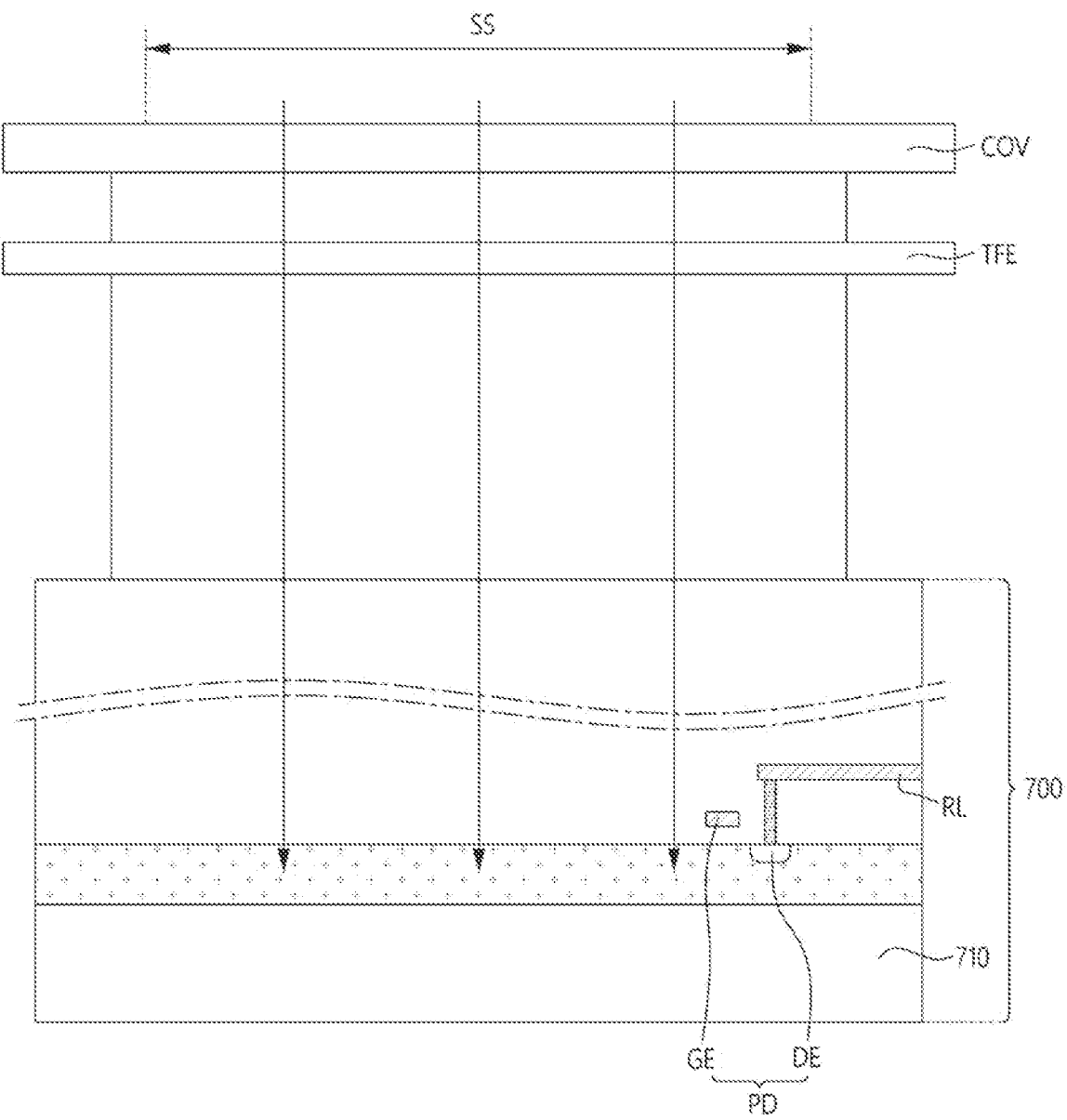
FIG. 8 is a cross-sectional view illustrating a sensor pixel of a display panel according to an embodiment of the present disclosure.
Figure 9:
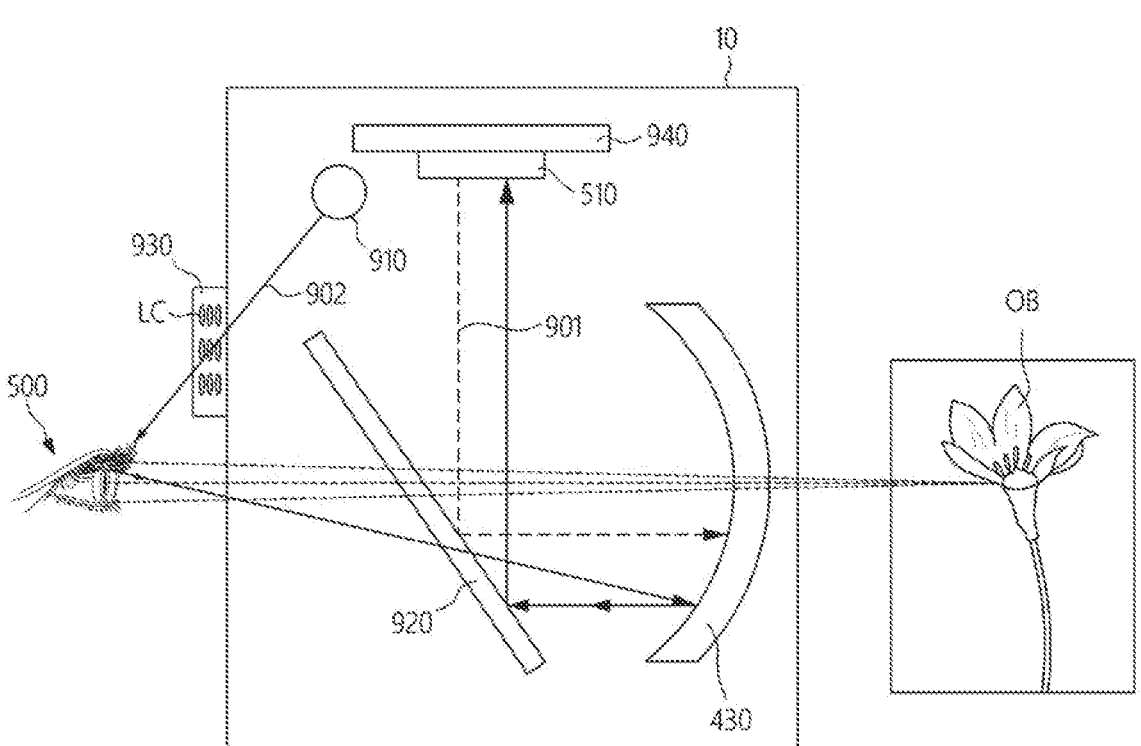
FIG. 9 is a conceptual view illustrating a light path of a display device according to an embodiment of the present disclosure.

The display device 10 may further include a light source unit, such as the light source unit 910 of FIG. 9, to track movement of the user's eye 500. The light source unit 910 may be configured to emit light different from the display light emitted by the display panel 510. For example, in an embodiment, the light source unit 910 may be configured to irradiate near-infrared light having an output wavelength in a range of about 780 nm to about 1400 nm towards the user's eye. The near-infrared light emitted from the light source unit 910 may be reflected from the user's eye 500, and the reflected near-infrared light may be input to the display panel 510. The display panel 510 is an optical sensor for receiving near-infrared light reflected from the user's eye 500 and tracking movement of the user's eye 500 by using the received near-infrared light. In an embodiment, the display panel 510 may include a gaze tracking sensor, such as sensor pixel SS of FIG. 6. In an embodiment, the gaze tracking sensor may include a photodiode, such as photodiode PD of FIG. 8 disposed in a sensor pixel of the display panel 510.

The glasses 430 may be disposed to correspond to the display area of the lens 200 of the wearable device. For example, in an embodiment the glasses 430 may be included in each of the left-eye lens 210 and the right-eye lens 220.

In an embodiment, the glasses 430 may include the waveguides 520 and 530. In an embodiment, the waveguides 520, 530 may include at least one of a display waveguide 520 or a gaze tracking waveguide 530.

In an embodiment, the display waveguide 520 may form a path of light by inducing light such that the display light emitted from the display panel 510 is emitted to the display area of the lens 200. For example, the display area of the lens 200 may be an area to which light propagating inside the display waveguide 520 is emitted.

In an embodiment, the display waveguide 520 may include at least one of at least one diffractive element or a reflective element, such as a reflective mirror. The display waveguide 520 may induce the display light emitted from the display panel 510 towards the user's eye 500 by using at least one diffractive element or the reflective element, which is included in the display waveguide 520. For example, in an embodiment the diffractive element may include input/ output grating, and the reflective element may include total internal reflection (TIR). An optical material (e.g., glass) may be processed in the form of a wafer, so that the optical material may be used as the display waveguide 520, and a refractive index of the display waveguide 520 may vary from about 1.5 to about 1.9.

The display waveguide 520 may include a material (e.g., glass or plastic) which totally reflects the display light in order to induce the display light towards the user's eye 500. However, embodiments of the present disclosure are not necessarily limited thereto and the material of the display waveguide 520 may vary.

In an embodiment, the display waveguide 520 may split the display light emitted from the display panel 510 in accordance with a wavelength (e.g., blue, green, or red) to move to a separate path in the display waveguide 520, respectively.

The display waveguide 520 may be disposed in a portion of the glasses 430. For example, in an embodiment the display waveguide 520 may be disposed on an upper end of the glasses 430 based on a virtual axis in which a center point of the glasses 430 and a center point of the user's eye 500 are matched with each other and a virtual line orthogonal to the virtual axis at the center point of the glasses 430. However, the area in which the display waveguide 520 is disposed is not necessarily limited to the above-described area of the glasses 430, and the area in which the display waveguide 520 is disposed may be any one of the areas of the glasses 430 such that the amount of light reflected in the user's eye 500 is greater than or equal to a reference value.

The sensor module 420 may include at least one sensor, such as a gaze tracking sensor and/or an illuminance sensor. However, embodiments of the present disclosure are not necessarily limited thereto and the sensor of the sensor module 420 may vary. For example, the at least one sensor may further include a proximity sensor or a contact sensor that senses whether the user has worn the display device 10. The display device 10 may sense whether the user wears the display device 10 through the proximity sensor or the contact sensor. In an embodiment, when the display device 10 senses that the user is wearing the display device 10, the display device 10 may be manually and/or automatically paired with another electronic device, such as a smart phone, etc.

The gaze tracking sensor may sense the reflective light reflected from the user's eye 500 based on the control of the processor 470. The display device 10 may convert the reflective light sensed through the gaze tracking sensor into an electrical signal. The display device 10 may acquire the user's eyeball image through the converted electrical signal. The display device 10 may track the user's gaze by using the acquired eyeball image of the user.

The illuminance sensor may sense illuminance (e.g., brightness) near the display device 10, the amount of the display light emitted from the display panel, brightness near the user's eye 500, or the amount of the reflective light reflected in the user's eye 500 based on the control of the processor 470.

The display device 10 may sense illuminance (e.g., brightness) near the user by using the illuminance sensor. The display device 10 may adjust the amount of light (e.g., brightness) of a display (e.g., the display panel 510) based on the sensed illuminance (e.g., brightness).

The gaze tracking waveguide 530 may form a path of light by inducing light such that the reflective light reflected from the user's eye 500 is input to the sensor module 420. The gaze tracking waveguide 530 may be used to transfer the reflective light to the gaze tracking sensor. In an embodiment, the gaze tracking waveguide 530 may be formed as an element that is the same as or different from the display waveguide 520.

The gaze tracking waveguide 530 may be disposed in a portion of the glasses 430. For example, in an embodiment based on a virtual axis, in which the center point of the glasses 430 and the center point of the user's eye 500 are matched with each other, and a virtual line orthogonal to the virtual line at the central point of the glasses 430, the gaze tracking waveguide 530 may be disposed on a lower end of the glasses 430. However, an area in which the gaze tracking waveguide 530 is disposed is not necessarily limited to the above-described area of the glasses 430, and may be disposed in any one of the areas of the glasses 430.

The battery 440 may supply power to at least one element of the display device 10. The battery 440 may be charged by being connected to an external power source in a wired or wireless manner.

The camera 450 may photograph an image near the display device 10. For example, the camera 450 may photograph an image of the user's eye 500 or photograph a real object image outside the display device 10.

In an embodiment, the first communication module 460 may include a wired interface or a wireless interface. The first communication module 460 may support direct communication (e.g., wired communication) or indirect communication (e.g., wireless communication) between the display device 10 and the external device (e.g., smartphone, or tablet PC).

In an embodiment, the first communication module 460 may include a wireless communication module (e.g., a cellular communication module, a short-range wireless communication module, or a global navigation satellite system (GNSS) communication module) or a wired communication module (e.g., a local area network (LAN) communication module or a power line communication module).

In an embodiment, the wireless communication module may support a 5G network, a 4G network and a next generation communication technology, for example, a new radio (NR) access technology. The NR access technology may support high-speed data transmission of high-capacity data (e.g., enhanced mobile broadband (eMBB)), minimization of terminal power, massive machine type communications (mMTC), or ultra-reliable and low-latency communications (URLLC). The wireless communication module 192 may support, for example, a high frequency band (e.g., mm Wave band) for achieving a high data transmission rate.

The wireless communication module may include a short-range wireless communication module. In an embodiment, the short-range communication may include at least one of wireless fidelity (WiFi), Bluetooth, Bluetooth low energy (BLE), Zigbee, near field communication (NFC), magnetic secure transmission, radio frequency (RF), or body area network (BAN).

Referring to FIG. 5, the display module 410 includes a display panel 510 for outputting display light, waveguides 520 and 530, and a projection lens 540.

The projection lens 540 may be configured to input light emitted from the display panel 510 into the waveguides 520 and 530. In FIG. 5, a portion of light flux emitted from the display panel 510 is input to the waveguides 520 and 530 through the projection lens 540.

In an embodiment, the waveguides 520 and 530 may have a plate shape. The waveguides 520 and 530 may include grating that performs a diffraction function, such as diffraction optical elements (DOE) or holographic optical elements (HOE), in a partial area of the plate. A period, depth or refractive index of the grating of the waveguides 520 and 530 may be varied based on conditions such as an output image viewing angle or a refractive index of a plate medium. The waveguides 520 and 530 may distribute an optical signal so that a portion of the optical signal (e.g., display light) input from the display panel 510 is transferred into the waveguide 530 and another portion of the optical signal is output to the outside of the waveguides 520 and 530.

In FIG. 5, the diffraction optical element has been described as an example of the waveguides 520 and 530. However, the waveguide may be replaced with a reflective optical element such as a reflective member 920 of FIG. 9.

Figure 6:
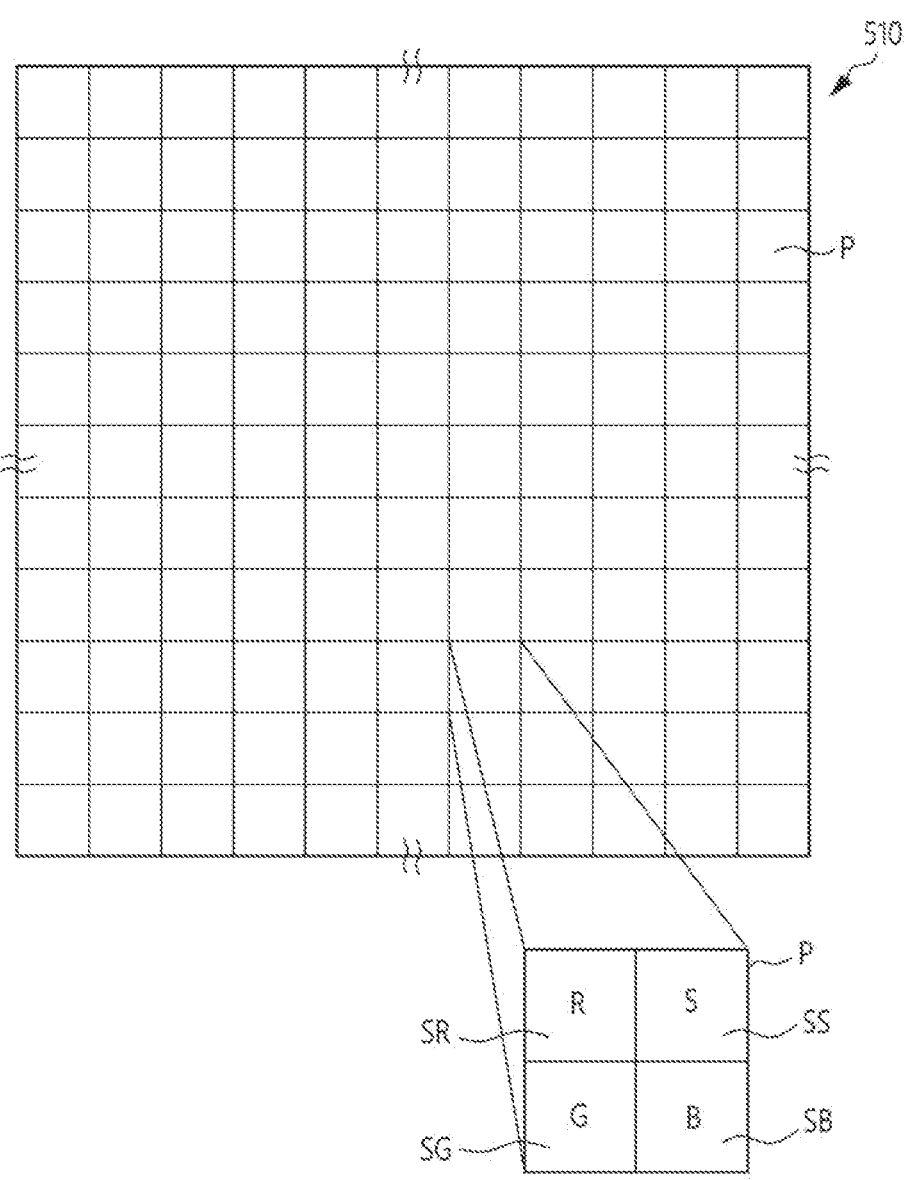
FIG. 6 is a plan view illustrating a display panel according to an embodiment of the present disclosure.
Figure 7:
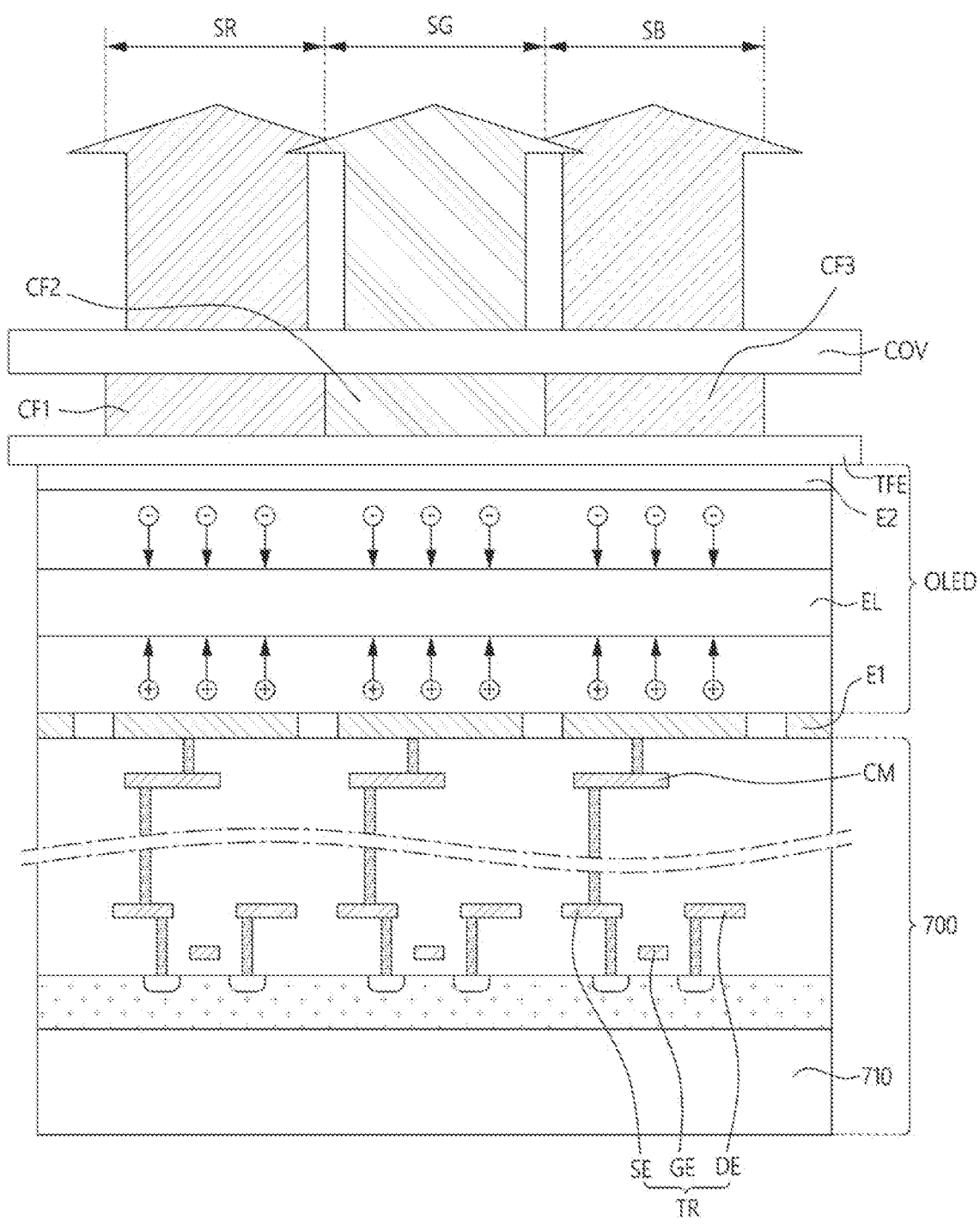
FIG. 7 is a cross-sectional view illustrating a light emission area of a display panel according to an embodiment of the present disclosure.

FIG. 6 is a plan view illustrating a display panel 510 according to an embodiment. FIG. 7 is a cross-sectional view illustrating a light emission area of a display panel 510 according to one embodiment. FIG. 8 is a cross-sectional view illustrating a sensor pixel SS of a display panel 510 according to an embodiment.

Referring to FIG. 6, the display panel 510 according to an embodiment may include a plurality of pixel groups P. The plurality of pixel groups P may be arranged in the form of a matrix on a plane of the display panel 510. For example, in an embodiment the display panel 510 may include m*n pixel groups P (e.g., unit pixels). In the present specification, sign * denotes a multiplication code.

In an embodiment, each of the plurality of pixel groups P may include a red pixel SR, a green pixel SG, a blue pixel SB, and a sensor pixel SS. For example, FIG. 6 illustrates that one pixel group P includes one red pixel SR, one green pixel SG, one blue pixel SB, and one sensor pixel SS. However, embodiments of the present disclosure are not necessarily limited thereto and various modifications and designs may be made in the arrangement of pixels included in each pixel group P and the colors of the pixels.

In an embodiment, the red pixel SR includes a red color filter CF1, and is configured to emit red light as the red color filter CF1 transmits the red light. However, embodiments of the present disclosure are not necessarily limited thereto. For example, in an embodiment, the red pixel SR may be configured so that an emission layer EL directly emits red light and the red color filter CF1 may be omitted.

The green pixel SG includes a green color filter CF2, and is configured to emit green light as the green color filter CF2 transmits green light. However, embodiments of the present disclosure are not necessarily limited thereto. For example, in an embodiment, the green pixel SG may be configured so that the emission layer EL directly emits green light and the green color filter CF2 may be omitted.

The blue pixel SB includes a blue color filter CF3, and is configured to emit blue light as the blue color filter CF3 transmits blue light. However, embodiments of the present disclosure are not necessarily limited thereto. For example, in an embodiment, the blue pixel SB may be configured so that the emission layer EL directly emits blue light and the blue color filter CF3 may be omitted.

The sensor pixel SS includes a photodiode PD, and may sense reflective light reflected from the user's eye 500. The photodiode PD may convert the sensed reflective light into an electrical signal and supply the converted electrical signal to the sensor module 420.

Referring to FIG. 7, the display panel 510 may include a semiconductor wafer substrate 700, an OLED disposed on the semiconductor wafer substrate 700, and color filters CF1, CF2 and CF3 disposed on the OLED. A thin-film encapsulation layer TFE covering the emission layer EL of the OLED may be disposed between the OLED and the color filters CF1, CF2 and CF3. A cover window COV may be disposed on the color filters CF1, CF2 and CF3. In an embodiment, the cover window COV may be attached onto the color filters CF1, CF2 and CF3 by a transparent adhesive member such as an optically clear adhesive (OCA) film. However, embodiments of the present disclosure are not necessarily limited thereto.

In an embodiment, the semiconductor wafer substrate 700 may include a base substrate 710 and a transistor TR disposed on the base substrate 710.

In an embodiment, the base substrate 710 may be a silicon substrate. The base substrate 710 may be a semiconductor pattern formed on a silicon substrate. For example, the base substrate 710 may be a silicon semiconductor substrate formed through a complementary metal oxide semiconductor (CMOS) process. In an embodiment, the base substrate 710 may include any one of a monocrystalline silicon wafer, a polycrystalline silicon wafer, and/or an amorphous silicon wafer. However, embodiments of the present disclosure are not necessarily limited thereto.

The transistor TR disposed on the base substrate 710 may include a gate electrode GE, a source electrode SE, and a drain electrode DE. In an embodiment, the transistor TR may be configured to independently control the red pixel SR, the green pixel SG and the blue pixel SB, which are included in each of the plurality of pixel groups P. In an embodiment, a connection electrode CM, conductive lines and conductive pads, which are electrically connected to the transistor TR, may be further disposed on the base substrate 710. The connection electrode CM, the conductive lines and the conductive pads may include a conductive material, for example, a metal material.

Referring to FIG. 8, the sensor pixel SS may include a photodiode PD. The photodiode PD may sense reflective light that is reflected from the user's eye 500 and convert the sensed reflective light into an electrical signal. In an embodiment, the photodiode PD may include a gate electrode GE for controlling the output of the electrical signal and a drain electrode DE for outputting the electrical signal to a read-out line RL. The photodiode PD may output the electrical signal corresponding to the sensed reflective light through the drain electrode DE in response to a control signal input to the gate electrode GE. The electrical signal of the photodiode PD may be transferred to the processor 470 outside the display panel 510 through the read-out line RL.

The OLED, which includes a first electrode E1, an emission layer EL, and a second electrode E2, may be disposed on the semiconductor wafer substrate 700.

The first electrodes E1 may be electrically connected to the transistor TR through the connection electrode CM of the semiconductor wafer substrate 700 and at least one contact hole connected thereto. In an embodiment, the first electrodes E1 may be anode electrodes for driving the emission layer EL of each of the red pixel SR, the green pixel SG and the blue pixel SB. The first electrodes E1 may be reflective electrodes. For example, the first electrodes E1 may reflect light emitted from the emission layer EL towards a downward direction. The first electrodes E1 may include a metal material having high light reflectance. For example, in an embodiment the first electrodes E1 may include any one of Al, Al/Cu and Al/TiN. As shown in FIG. 8, the first electrodes E1 may not be formed in the sensor pixel SS. For example, the sensor pixel SS may not include the first electrodes E1.

The emission layer EL may be disposed on the first electrodes E1. In an embodiment, the emission layer EL may include a single layer or a plurality of stacked structures. The emission layer EL may be configured to emit white light. The white light may be, for example, light in which blue light, green light, and red light are mixed together. Alternatively, the white light may be light in which blue light and yellow light are mixed together. As shown in FIG. 8, the emission layer EL may not be formed in the sensor pixel SS. For example, the sensor pixel SS may not include the emission layer EL.

The second electrode E2 may be disposed on the emission layer EL. The second electrode E2 may be a common electrode, for example, a cathode electrode. In an embodiment, the second electrode E2 may be a transmissive or transflective electrode. For example, the second electrode E2 may transmit light emitted from the emission layer EL. The second electrode E2 may include a conductive material. For example, in an embodiment the second electrode E2 may include Li, Ca, LiF/Ca, LiF/Al, Al, Mg, BaF, Ba, Ag, Au, Cu, or their compound or mixture, which has a low work function. As shown in FIG. 8, the second electrode E2 may not be formed in the sensor pixel SS. For example, the sensor pixel SS may not include the second electrode E2.

The thin-film encapsulation layer TFE may be disposed on the OLED (e.g., disposed directly thereon). The thin-film encapsulation layer TFE may be configured to encapsulate the emission layer EL so that oxygen or moisture may be prevented from being permeated into the emission layer EL.

In an embodiment, the thin-film encapsulation layer TFE may be disposed on an upper surface and may also be disposed on sides of the emission layer EL. In an embodiment, the thin-film encapsulation layer TFE may include at least one inorganic layer to prevent oxygen or moisture from being permeated into the emission layer EL. In addition, the thin-film encapsulation layer TFE may include at least one organic layer to protect the emission layer EL from external contaminants, such as dust particles, etc. In an embodiment, the inorganic layer of the thin-film encapsulation layer TFE may be formed of a multi-layer in which one or more inorganic layers of a silicon nitride layer, a silicon oxynitride layer, a silicon oxide layer, a titanium oxide layer and an aluminum oxide layer are alternately stacked on each other. The organic layer of the thin-film encapsulation layer TFE may be an organic layer such as an acryl resin, an epoxy resin, a phenolic resin, a polyamide resin, or a polyimide resin.

The color filters CF1, CF2 and CF3 may be disposed on the thin-film encapsulation layer TFE. In an embodiment, the color filters CF1, CF2 and CF3 may include a red color filter CF1 (e.g., a first color filter) that transmits red light, a green color filter CF2 (e.g., a second color filter) that transmits green light, and a blue color filter CF3 (e.g., a third color filter) that transmits blue light. The red color filter CF1 may be disposed to correspond to the red pixel SR, thereby transmitting red light among the white light emitted from the emission layer EL of the red pixel SR. The green color filter CF2 may be disposed to correspond to the green pixel SG, thereby transmitting green light among the white light emitted from the emission layer EL of the green pixel SG. The blue color filter CF3 may be disposed to correspond to the blue pixel SB, thereby transmitting blue light among the white light emitted from the emission layer EL of the blue pixel SB. As shown in FIG. 8, the color filters CF1, CF2 and CF3 may not be formed in the sensor pixel SS. For example, the sensor pixel SS may not include any of the color filters CF1, CF2 and CF3.

FIG. 9 is a conceptual view illustrating a light path of the display device 10 according to an embodiment.

Referring to FIG. 9, the display device 10 may include glasses 430 disposed to correspond to a display area of a lens 200 of a wearable device 100, a display panel 510 that emits display light, a circuit board 940 on which the display panel 510 is mounted, a reflective member (e.g., a beam splitter) 920 that reflects the display light emitted from the display panel 510 towards the glasses 430, a light source unit 910 that emits near-infrared light for tracking the movement of the user's eye 500, and a protective filter 930 that protects the user's eye 500 from the near-infrared light, by blocking a portion of the light path traveling towards the user's eye 500 from the light source unit 910.

The display panel 510 may emit display light for displaying an augmented reality image (or a virtual reality image) based on the control of the processor 470. For example, like an arrow 901 (FIG. 9) indicates, the display light emitted from the display panel 510 may be transferred to the glasses 430 through the reflective member 920, and the user's eye 500 may view the light guided to the glasses 430, thereby viewing an object OB of the augmented reality image (or a virtual reality image).

The display device 10 senses the movement of the user's eyes using near-infrared light and determines the direction of the user's gaze. The display device 10 determines a central vision area corresponding to the user's gaze and a peripheral vision area excluding the central vision area. In an embodiment, the display device 10 may apply a foveated rendering technology that displays a high-resolution screen in the central vision area and a low-resolution screen in the peripheral vision area. For example, like an arrow 902 indicates, light emitted from the light source unit 910 of the display device 10 is reflected from the user's eye 500. The near-infrared light reflected by the user's eye 500 is directed to the display panel 510 via the glasses 430 and the reflective member 920. As described with reference to FIGS. 6 and 8, the display panel 510 may include the sensor pixel SS to sense the reflective light and generate an electrical signal corresponding to the reflected light, thereby tracking the user's eyes.

On the other hand, the near-infrared light for tracking the movement of the user's eyes is light having an output wavelength in a range of about 780 nm to about 1400 nm. When the user's eyes are irradiated for a long time, the light may deteriorate the visual acuity of the eye, damage the retina, or damage the cornea. However, in the display device 10 according to an embodiment of the present disclosure, the protective filter 930 is applied to protect the user's eyes from the near-infrared light. The protective filter 930 may be configured to protect the user's eye 500 from near-infrared light by blocking a portion of the light path traveling towards the user's eye 500 from the light source unit 910.

In an embodiment, the processor 470 may control the liquid crystal layer LC of the protective filter 930 to change the blocking area 1010 (FIG. 10) that blocks the light path and the transmission area 1020 that does not block the light path and permits the light to extend therethrough towards the user's eye 500. For example, the protective filter 930 may form the blocking area 1010 to block near-infrared light, blue light, light intensity above a specified level, and/or heat above a specified temperature to protect the user's eye 500.

Figure 10:
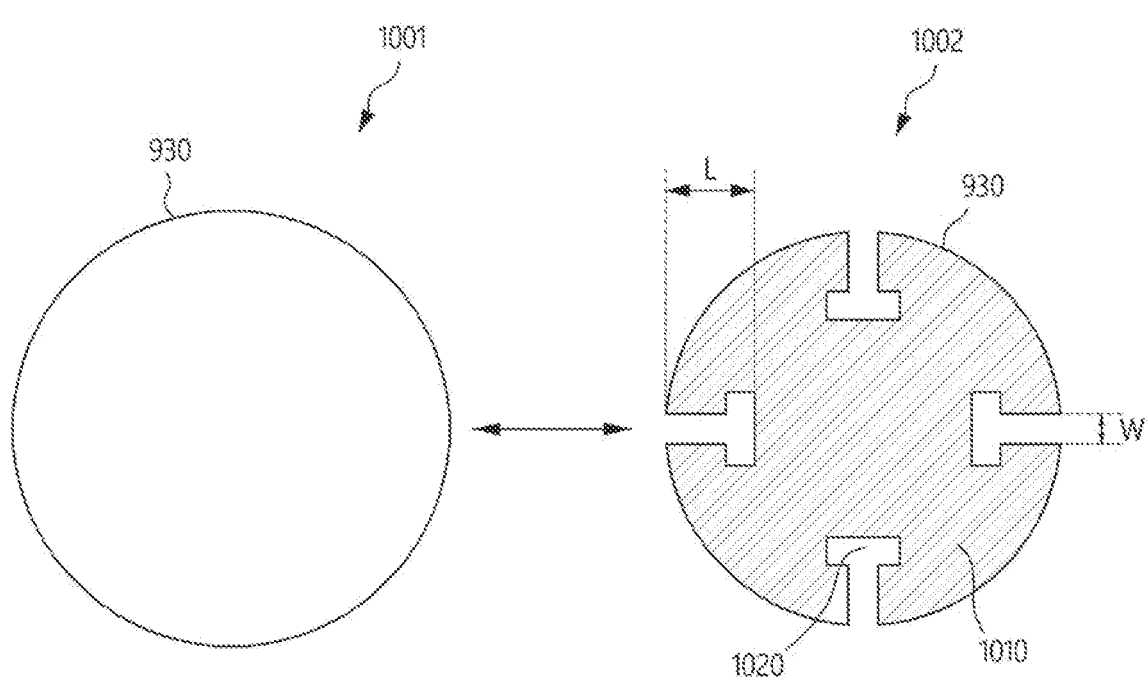
FIG. 10 is a view of a protective filter illustrated in FIG. 9 according to an embodiment of the present disclosure.
Figure 11:
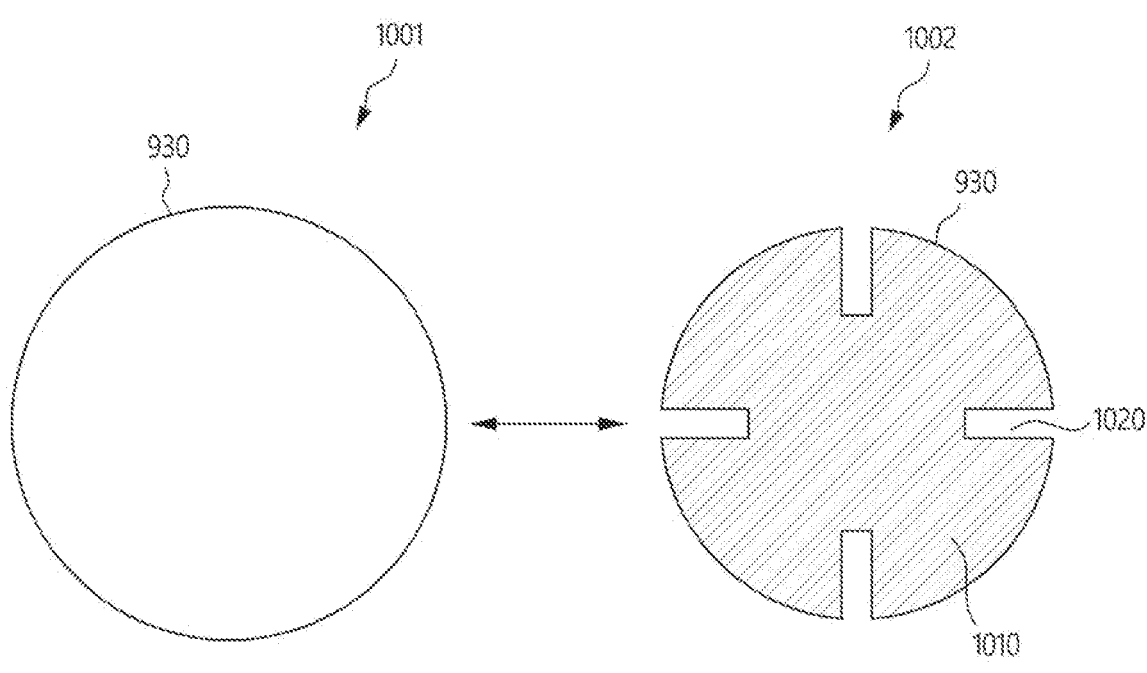
FIG. 11 is a view of a protective filter illustrated in FIG. 9 according to an embodiment of the present disclosure.

FIG. 10 is a view of an embodiment of a protective filter 930 illustrated in FIG. 9. FIG. 11 is a view of an embodiment of a protective filter 930 illustrated in FIG. 9. In FIG. 10, 1001 is an example showing a state in which the liquid crystal layer LC of the protective filter 930 is not driven. In FIGS. 10 and 11, 1002 is an example showing a state in which the liquid crystal layer LC of the protective filter 930 is driven to form the blocking area 1010 and the transmission area 1020.

Referring to FIGS. 10 and 11, in an embodiment the display device 10 may detect the shape of the user's eye 500 in advance and apply the protective filter 930 based on the previously detected shape of the user's eye 500. In an embodiment, the shape of the user's eye 500 may include the size of the user's pupil and the size of the user's iris.

In an embodiment, the transmission area 1020 may be disposed to surround the outside of the blocking area 1010, and the remaining areas except the transmission area 1020 may be set as the blocking area 1010. For example, in an embodiment the blocking area 1010 may have a shape, size, length, or width that is customized for a user. To this end, the display device 10 may detect the shape of the user's eye 500 in advance in response to a trigger event in which the power of the display device 10 is turned on or a trigger event in which the user wears the wearable device. The display device 10 may determine the shape of the protective pattern forming the blocking area 1010 based on the detected shape of the user's eyes.

In an embodiment, the transmission area 1020 may be disposed to surround the outside of the blocking area 1010, and the remaining areas except the transmission area 1020 may be the blocking area 1010. As shown in an embodiment of FIG. 10, the transmission area 1020 may include a plurality of transmission areas 1020 having a "T" shape, and the plurality of transmission areas 1020 may be arranged so as to be symmetrical with respect to the center of the protective filter 930. The stem of the "T" shape may extend to an outer circumference of the protective filter 930. In an embodiment as shown in FIG. 11, the transmission area 1020 may include a plurality of transmission areas 1020 having an "I" shape, and the plurality of transmission areas 1020 may be arranged so as to be symmetrical with respect to the center of the protective filter 930. A portion of the "I" shape may extend to an outer circumference of the protective filter 930. However, embodiments of the present disclosure are not necessarily limited thereto and the shape of the protection pattern determined by the transmission area 1020 and the blocking area 1010 may be variously changed from the examples shown in FIGS. 10 and 11.

In an embodiment, the length L and width W of each of the plurality of transmission areas 1020 may be customized according to the shape of the user's eye 500. The display device 10 according to an embodiment of the present disclosure may provide increased protection for the user's eye 500 by varying the protection pattern of the protective filter 930 in a user-customized manner.

Figure 12:
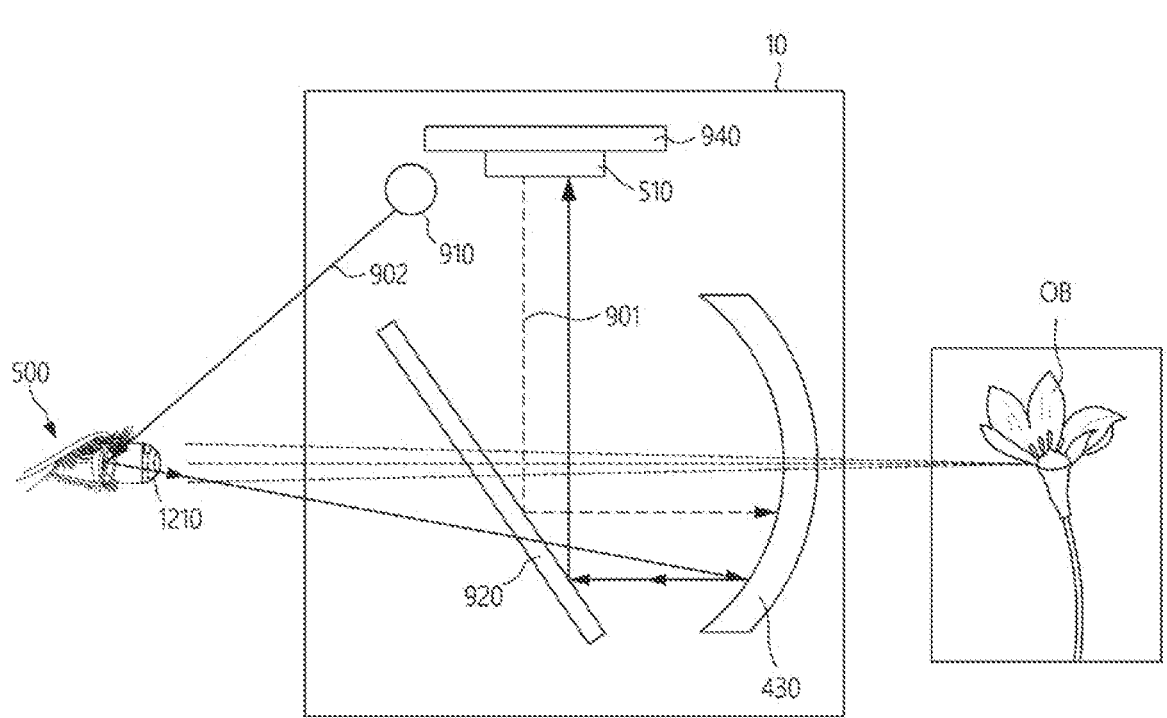
FIG. 12 is a conceptual view illustrating a light path of a display device according to an embodiment of the present disclosure.
Figure 13:
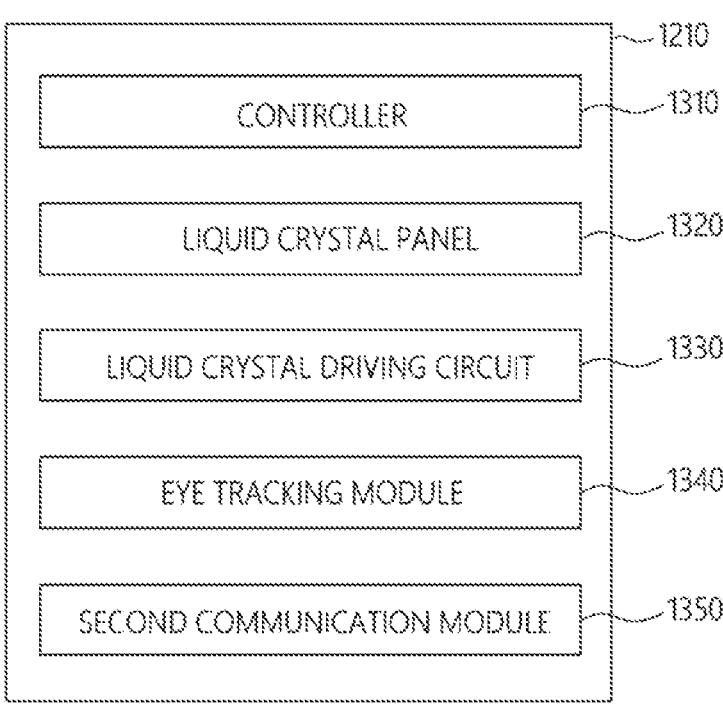
FIG. 13 is a configuration block diagram of a protective lens illustrated in FIG. 12 according to an embodiment of the present disclosure.

FIG. 12 is a conceptual view illustrating a light path of a display device according to an embodiment. FIG. 13 is a configuration block diagram of a smart contact lens 1210 illustrated in FIG. 12.

The embodiments of FIGS. 12 and 13 may be at least partially similar to an embodiment of FIG. 9. Hereinafter, elements of embodiments of FIGS. 12 and 13 that are different from the embodiment of FIG. 9 will be described for economy of description. Accordingly, features not described in FIGS. 12 and 13 will be replaced with the description of an embodiment of FIG. 9.

Unlike the embodiment of FIG. 9, the embodiments of FIGS. 12 and 13 are different in that the protective filter 930 included in the body of the display device 10 is omitted and the smart contact lens 1210 attached directly to the user's eye 500 is provided. For example, the smart contact lens 1210 may be a separate device that operates in conjunction with the display device 10. In an embodiment, the smart contact lens 1210 may provide a function of detecting the movement of the user's eye 500, a communication function of transmitting a signal related to the detected movement of the user's eye 500 to the display device 10, and a function of protecting the user's eye 500 from near-infrared light by driving a liquid crystal panel 1320 based on a signal inputted from the display device 10.

Referring to FIG. 13, the smart contact lens 1210 may include a controller 1310, a liquid crystal panel 1320, a liquid crystal driving circuit 1330, an eye tracking module 1340, and a second communication module 1350.

The controller 1310 may be configured to control the overall operation of the smart contact lens 1210. According to an embodiment, the controller 1310 and a second communication circuit may be merged into one component.

The liquid crystal panel 1320 may be disposed to cover the front surface of the smart contact lens 1210 and may provide a protective function of protecting the user's eye 500 from near-infrared light by including liquid crystal for adjusting refractive power. In an embodiment, the liquid crystal panel 1320 may be driven by the liquid crystal driving circuit 1330, and the liquid crystal driving circuit 1330 may drive the liquid crystal of the liquid crystal panel 1320 based on a signal inputted from the display device 10. For example, the liquid crystal driving circuit 1330 may change the blocking area 1010 and the transmission area 1020 of the liquid crystal panel 1320 based on a signal input from the display device 10. The blocking area 1010 and the transmission area 1020 of the liquid crystal panel 1320 may be changed in a user-customized manner and may be similar to the protection pattern of the protective filter 930 described with reference to FIGS. 10 and 11. For example, the transmission area 1020 includes a plurality of transmission areas 1020, and the plurality of transmission areas 1020 are disposed to surround the outside of the blocking area 1010. In an embodiment, the plurality of transmission areas 1020 are arranged symmetrically with respect to the center of the smart contact lens 1210.

The smart contact lens 1210 may drive the liquid crystal disposed on a portion of the liquid crystal panel 1320 corresponding to the blocking area 1010 so that the near-infrared light emitted from the light source unit 910 of the display device 10 blocks a portion of the light path traveling towards the user's eye 500.

The smart contact lens 1210 may drive the liquid crystal disposed on the other portion of the liquid crystal panel 1320 corresponding to the transmission area 1020 so that the near-infrared light emitted from the light source unit 910 of the display device 10 does not block the light traveling towards the user's eye 500.

In an embodiment, the eye tracking module 1340 of the smart contact lens 1210 may detect the movement of the user's eye 500 and transmit a signal related to the detected movement of the user's eye 500 through the second communication module 1350. For example, the eye tracking module 1340 may generate a signal related to the movement of the user's eye 500 while the user is wearing the smart contact lens 1210. In an embodiment, the smart contact lens 1210 may transmit the generated signal to the display device 10 in real time. The display device 10 determines the direction of the user's sight, the central vision area corresponding to the user's sight, and the peripheral vision area excluding the central vision area based on the signal inputted from the smart contact lens 1210. In an embodiment, the display device 10 may apply a foveated rendering technology that displays a high-resolution screen in the central vision area and a low-resolution screen in the peripheral vision area.

In an embodiment, the second communication module 1350 may allow the smart contact lens 1210 and the display device 10 to wirelessly communicate with each other using short-range communication. Short-range communication may include, for example, near field communication (NFC) communication. To this end, the smart contact lens 1210 may include an antenna coil designed to have a resonant frequency in a range of about 12 MHz to about 14 MHz. For example, the antenna coil may be designed to resonate at about 13.56 MHz.

FIG. 14 is a flow chart illustrating an operation of a display device 10 according to one embodiment.

The operations illustrated in FIG. 14 may be performed by the processor 470 of the display device 10 controlling components of the display device 10.

However, embodiments of the present disclosure are not necessarily limited thereto and at least some of the operations shown in FIG. 14 may be omitted. Before or after at least some of the operations shown in FIG. 14, at least some of the operations mentioned with reference to other drawings in the present disclosure may be additionally inserted. Hereinafter, an operation of the display device 10 according to an embodiment will be described with reference to FIG. 14.

In operation 1410, the display device 10 may detect whether the wearable device 100 is being worn by the user.

If the display device 10 detects that the wearable device 100 is being worn by the user, the display device 10 may then detect the shape of the user's eye 500. For example, the display device 10 may use a proximity sensor or a contact sensor to detect whether the wearable device 100 is worn by the user. When the display device 10 detects that the user is wearing the display device 10, the display device 10 may drive the light source unit 910 to emit near-infrared light. The display device 10 may determine the shape of the user's eye 500 by sensing the near-infrared light reflected by the user's eye 500 through the sensor pixels of the display panel 510. In an embodiment, the shape of the user's eye 500 may include the size of the user's pupil and the size of the user's iris.

In operation 1420, the display device 10 may determine the shape of the protection pattern based on the detected shape of the user's eye 500. For example, the display device 10 may determine the shape of the plurality of transmission areas 1020 and the length L and the width W of each of the plurality of transmission areas 1020 in a user-customized manner according to the shape of the user's eye 500 to increase the level of protection to the user's eye 500 while permitting a sufficient amount of light to extend towards the use's eye 500.

In operation 1430, the display device 10 may drive the liquid crystal of the protective filter 930 based on the determined shape of the protection pattern. For example, the protective filter 930 may drive the liquid crystal layer LC to form the transmission area 1020 and the blocking area 1010. The transmission area 1020 may be disposed to surround the outside of the blocking area 1010, and the remaining areas except the transmission area 1020 may be set as the blocking area 1010. In an embodiment as shown in FIG. 10, the transmission area 1020 may include a plurality of transmission areas 1020 having a "T" shape, and the plurality of transmission areas 1020 may be arranged so as to be symmetrical with respect to the center of the protective filter 930. In an embodiment as shown in FIG. 11, the transmission area 1020 may include a plurality of transmission areas 1020 having an "I" shape, and the plurality of transmission areas 1020 may be arranged so as to be symmetrical with respect to the center of the protective filter 930. The shape of the protection pattern determined by the transmission area 1020 and the blocking area 1010 is not necessarily limited to the examples shown in FIGS. 10 and 11 and may be variously changed.

As shown in FIG. 12, if the smart contact lens 1210 is provided instead of the protective filter 930, the display device 10 may send a signal related to the shape of the protection pattern to the smart contact lens 1210, thereby controlling the liquid crystal panel 1320 of the smart contact lens 1210. As the smart contact lens 1210 drives the liquid crystal panel 1320 based on a signal input from the display device 10, a transmission area 1020 and a blocking area 1010 may be formed.

In operation 1440, the display device 10 may output near-infrared light while the liquid crystal of the protective filter 930 is driven. As shown in FIG. 12, if the smart contact lens 1210 is provided instead of the protective filter 930, the display device 10 may output near-infrared light while the liquid crystal panel 1320 of the smart contact lens 1210 operates.

In operation 1450, the display device 10 may track the user's eye 500 by detecting the near-infrared light reflected by the user's eye 500 through the sensor pixel of the display panel 510. The display device 10 determines the direction of the user's sight (e.g., field of view) and the central vision area corresponding to the user's sight and the peripheral vision area excluding the central vision area by tracking the user's eye 500. In an embodiment, the display device 10 may apply a foveated rendering technology that displays a high-resolution screen in the central vision area and a low-resolution screen in the peripheral vision area. While the display device 10 of the present disclosure tracks the user's eyes 500 and performs a foveated rendering function, the protective filter 930 or the smart contact lens 1210 may block a portion of the light path traveling towards the user's eye 500 from the light source unit 910, thereby protecting the user's eye 500 from the near-infrared light.

In concluding the detailed description, those skilled in the art will appreciate that many variations and modifications can be made to the described embodiments without substantially departing from the principles of the present disclosure. Therefore, the described embodiments of the invention are used in a generic and descriptive sense only and not for purposes of limitation.

What is claimed is:

1. A display device comprising:
glasses disposed to correspond to a display area of a lens;
a display panel emitting display light;
a reflective member reflecting the display light emitted from the display panel in a direction towards the glasses;
a light source unit emitting near-infrared light towards a user's eyes for tracking a user's eyes;
a protective filter including a liquid crystal layer, the protective filter blocking a portion of a light path of the near-infrared light emitted towards the user's eyes from the light source unit; and
a processor controlling the liquid crystal layer, the liquid crystal layer forming a blocking area blocking the portion of the light path of the near-infrared light emitted towards the user's eyes and a transmission area that does not block the light path of the near-infrared light emitted towards the user's eyes.

2. The display device of claim 1,
wherein the display panel comprises a semiconductor wafer substrate and an OLED disposed on the semiconductor wafer substrate.

3. The display device of claim 2, wherein the display panel comprises:
a red pixel emitting red light, a green pixel emitting green light and a blue pixel emitting blue light; and
a sensor pixel including a photodiode sensing near-infrared light from the light source unit that is reflected by the user's eyes.

4. The display device of claim 1, wherein:
the transmission area comprises a plurality of transmission areas,
wherein the plurality of transmission areas are disposed to surround an outside of the blocking area.

5. The display device of claim 4,
wherein the plurality of transmission areas are arranged to be symmetrical with respect to a center of the protective filter.

6. The display device of claim 4,
wherein the processor adjusts a length and a width of each of the plurality of transmission areas according to a shape of an eye of the user.

7. The display device of claim 4, wherein the processor:
senses a shape of an eye of the user in response to a trigger event that detects that the user is wearing the display device;

determines a shape of a protection pattern comprising the plurality of transmission areas and the blocking area based on the sensed shape of the user's eye; and
drives the liquid crystal layer to form the protection pattern having the determined shape of the protection pattern.

8. The display device of claim 7,
wherein the shape of the user's eye includes a size of a pupil of the user and a size of an iris of the user.

9. The display device of claim 7, wherein the processor:
controls the light source unit to emit the near-infrared light while a liquid crystal layer of the protective filter is driven;
tracks the user's eye by detecting near-infrared light from the light source unit that is reflected by the user's eye using sensor pixels of the display panel;
determines a central vision area corresponding to a sight of the user and a peripheral vision area excluding the central vision area based on the tracked user's eye; and
controls the display panel to display a screen with a higher resolution in the central vision area than in the peripheral vision area.

10. A display device comprising:
glasses disposed to correspond to a display area of a lens;
a display panel emitting display light;
a reflective member reflecting the display light emitted from the display panel in a direction towards the glasses;
a light source unit emitting near-infrared light towards a user's eyes for tracking a user's eyes;
a smart contact lens attached directly to an eye of the user, the smart contact lens including a liquid crystal panel blocking a portion of a light path of the near-infrared light emitted towards the user's eye from the light source unit; and
a processor controlling the liquid crystal panel through wireless communication, the liquid crystal panel forming a blocking area blocking the portion of the light path of the near-infrared light emitted towards the user's eye and a transmission area that does not block the light path towards the user's eye.

11. The display device of claim 10,
wherein the display panel comprises a semiconductor wafer substrate and an OLED disposed on the semiconductor wafer substrate.

12. The display device of claim 11, wherein the display panel comprises:
a red pixel emitting red light, a green pixel emitting green light and a blue pixel emitting blue light; and
a sensor pixel including a photodiode sensing the light path of the near-infrared light from the light source unit that is reflected by the user's eyes.

13. The display device of claim 10, wherein:
the transmission area comprises a plurality of transmission areas,
wherein the plurality of transmission areas are disposed to surround an outside of the blocking area.

14. The display device of claim 13,
wherein the plurality of transmission areas are arranged to be symmetrical with respect to a center of the smart contact lens.

15. The display device of claim 13,
wherein the processor adjusts a length and a width of each of the plurality of transmission areas according to a shape of the user's eye.

16. The display device of claim 13, wherein the processor:

senses a shape of the user's eye in response to a trigger event that detects that the user is wearing the display device;

determines a shape of a protection pattern comprising the plurality of transmission areas and the blocking area based on the sensed shape of the user's eye; and drives the liquid crystal panel to form the protection pattern having the determined shape of the protection pattern.

17. The display device of claim 16, wherein the shape of the user's eye includes a size of a pupil of the user and a size of an iris of the user.

18. The display device of claim 16, wherein the processor:

controls the light source unit to emit the near-infrared light while a liquid crystal panel of the smart contact lens is driven;

tracks the user's eye by detecting near-infrared light from the light source unit that is reflected by the user's eye using sensor pixels of the display panel;

determines a central vision area corresponding to a sight of the user and a peripheral vision area excluding the central vision area based on the tracked user's eye; and controls the display panel to display a screen with a higher resolution in the central vision area than in the peripheral vision area.

19. A method of driving a display device comprising glasses disposed to correspond to a display area of a lens and a reflective member reflecting display light emitted from a display panel towards the glasses, the method comprising:

detecting a shape of a user's eye in response to a trigger event that determines that the display device is being worn by the user;

determining a shape of a protection pattern comprising a plurality of transmission areas and a blocking area based on the detected shape of the user's eye; and controlling a liquid crystal layer of a protective filter to block a portion of a light path of near-infrared light emitted towards the user's eye from a light source unit based on the determined shape of the protection pattern.

20. The method of claim 19, further comprising:

controlling the light source unit to emit the near-infrared light while the liquid crystal layer of the protective filter is driven;

tracking the user's eye by detecting near-infrared light from the light source unit reflected by the user's eye using sensor pixels of the display panel;

determining a central vision area corresponding to a sight of the user and a peripheral vision area excluding the central vision area based on the tracked user's eye; and controlling the display panel to display a screen with a higher resolution in the central vision area than in the peripheral vision area.

* * * * *